Sept. 11, 1962 H. D. WILSTED ETAL 3,053,045
TELESCOPING VANES FOR JET THRUST REVERSER
Filed May 19, 1960 3 Sheets-Sheet 1

INVENTORS
HAROLD D. WILSTED
EUGENE GOTTSCHALK
BY
J. L. Carpenter
ATTORNEY

INVENTORS
HAROLD D. WILSTED
EUGENE GOTTSCHALK
BY J. L. Carpenter
ATTORNEY

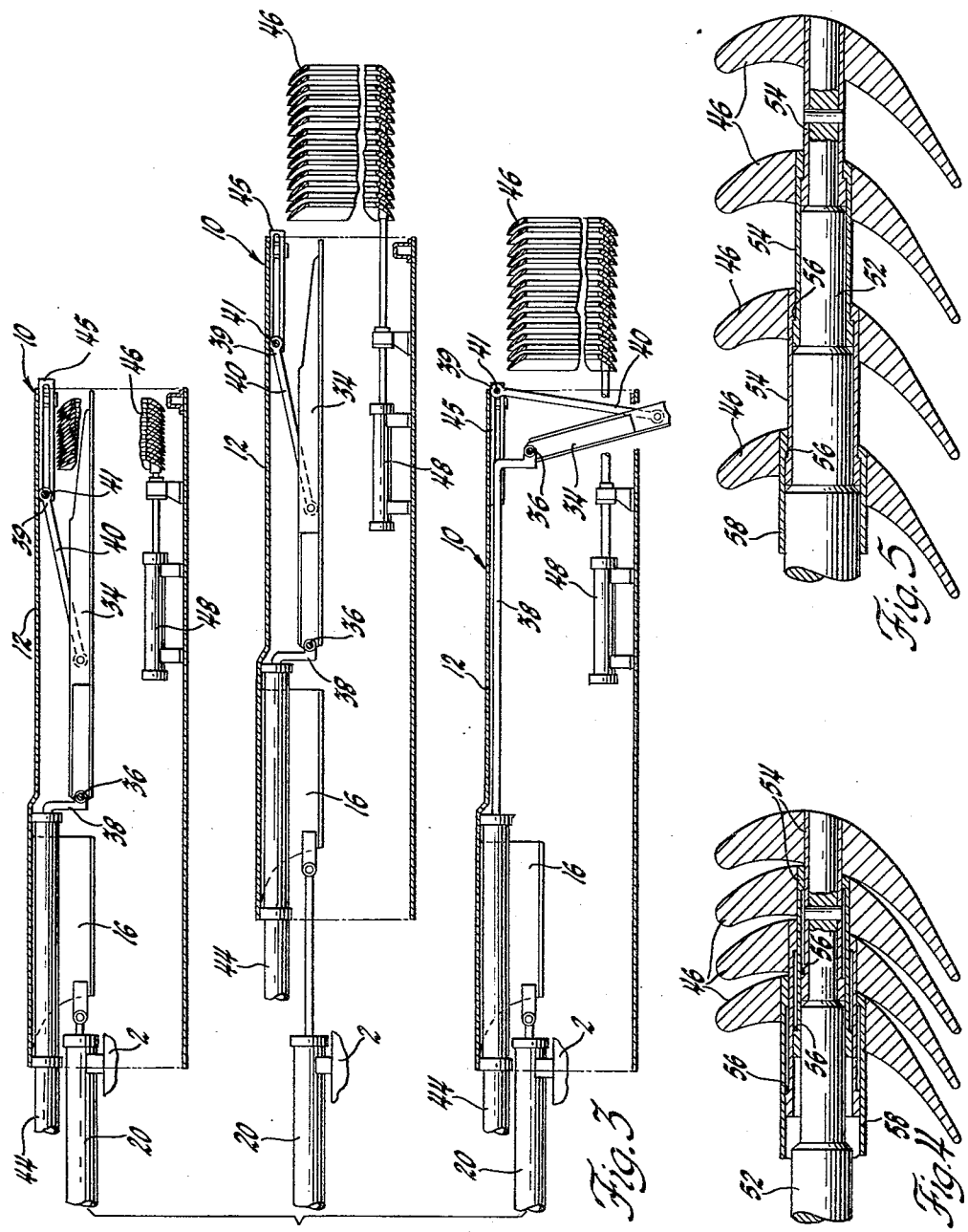

United States Patent Office 3,053,045
Patented Sept. 11, 1962

3,053,045
TELESCOPING VANES FOR JET
THRUST REVERSER
Harold D. Wilsted, Indianapolis, Ind., and Eugene Gottschalk, Gilbertsville, Ky., assignors to General Motors Corporation, Detroit, Mich., a corporation of Delaware
Filed May 19, 1960, Ser. No. 30,169
1 Claim. (Cl. 60—35.54)

This invention relates to jet type aircraft engines and is particularly concerned with means for reversing or changing the direction of the thrust of such engines.

One object of the present invention is to provide novel and simple jet end thrust reversing mechanism which is readily adaptable to and suitable for use in substantially all types of aircraft jet engine installations without extensive change thereto.

A further object of the invention is to provide thrust reversing means which utilize vanes that may be collapsed and stored in a compact manner so as to reduce the amount of space taken up by such vanes when inoperative, but which may be readily moved axially relative to each other so as to provide laterally extending passages therebetween to deflect the jet laterally to the atmosphere and create a braking effect.

For the above and further objects of this invention, reference may be made to the following detailed description taken in conjunction with the accompanying drawings in which.

Figure 1:
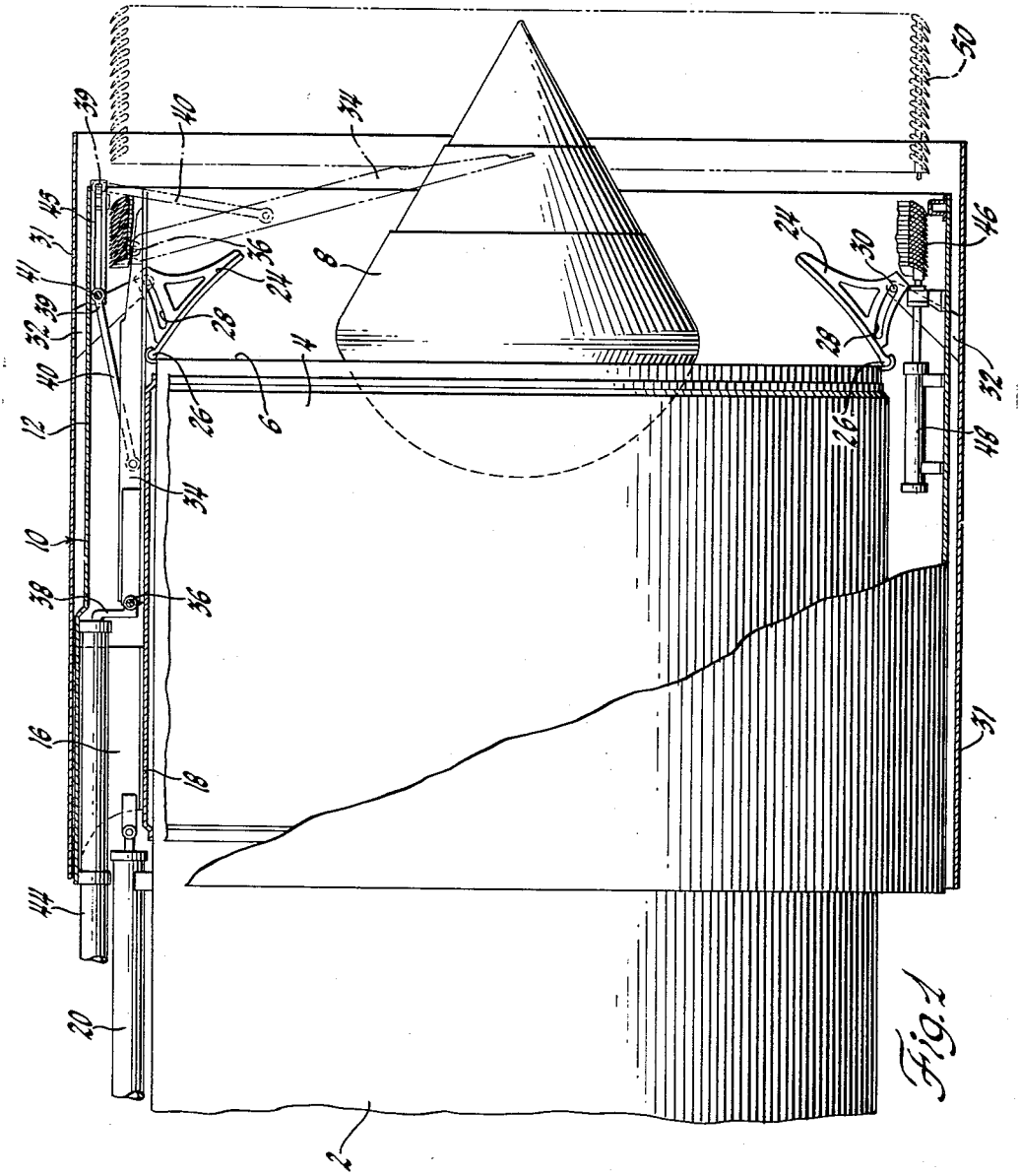
FIGURE 1 is a side view in elevation with portions broken away and in section taken substantially on the line 1—1 of FIGURE 2 illustrating the rearward end of a portion of a jet engine with the novel thrust reversing mechanism superimposed thereon.

FIGURE 3 represents a series of diagrammatic views similar to FIGURE 1 but showing the thrust mechanism in various stages of operation: the first shows the movable outer wall structure at the end of the engine in its forward position with the thrust diverters and the reversing vanes stored; the second shows the outer movable wall structure moved rearwardly and the reversing vanes extended; the third shows the thrust diverters in an operative position with the outer wall structure again moved forward to deflect the gases of the jet into the laterally extending passages formed between the reverser vanes which remain in their extended position.

FIGURE 4 is a view in section showing details of how the reverser vanes are telescopically nested together in a retracted position.

FIGURE 5 is a view similar to FIGURE 4 except with the reverser vanes extended axially.

Referring first to FIGURE 1, the rearward end of an aircraft jet engine is shown. The end 2 comprises an inner wall construction 4 forming a propelling nozzle 6 which produces an axially flowing jet. The nozzle 6 has extending thereinto a bullet or tail cone 8 which is coaxial with the nozzle and cooperates therewith to give the desired flow characteristics.

Exterior of the wall construction 4 is an outer movable wall construction 10 forming an actuating shroud 12. The movable outer wall or actuating shroud 12 is maintained properly spaced from the inner wall construction 4 by a plurality of spacer plates 16 secured thereto and slidable on the tracks 18. Secured between the inner wall construction 4 and the plates 16 are a series of circumferentially spaced servomotors 20 which may be energized to move the movable outer wall or shroud 12 toward the rear of the engine as indicated by the second position of FIGURE 3. The nozzle 6, formed by the inner wall construction 4, may have its opening varied by a plurality of nozzle iris segments 24 which extend around the nozzle 6 and are pivotally secured to the periphery thereof as indicated at 26. Each of these nozzle iris segments 24 includes a cam track 28 in which rides a pin 30 secured to a bracket 32 in turn secured to the inner side of a wall construction 31 outward of movable outer wall or shroud 12. Independently controlled fore and aft movement of this wall construction 31 outward of movable outer wall or shroud 12 will control movement of the nozzle iris segments 24 to increase or reduce the size of the opening of the nozzle 6.

Figure 2:
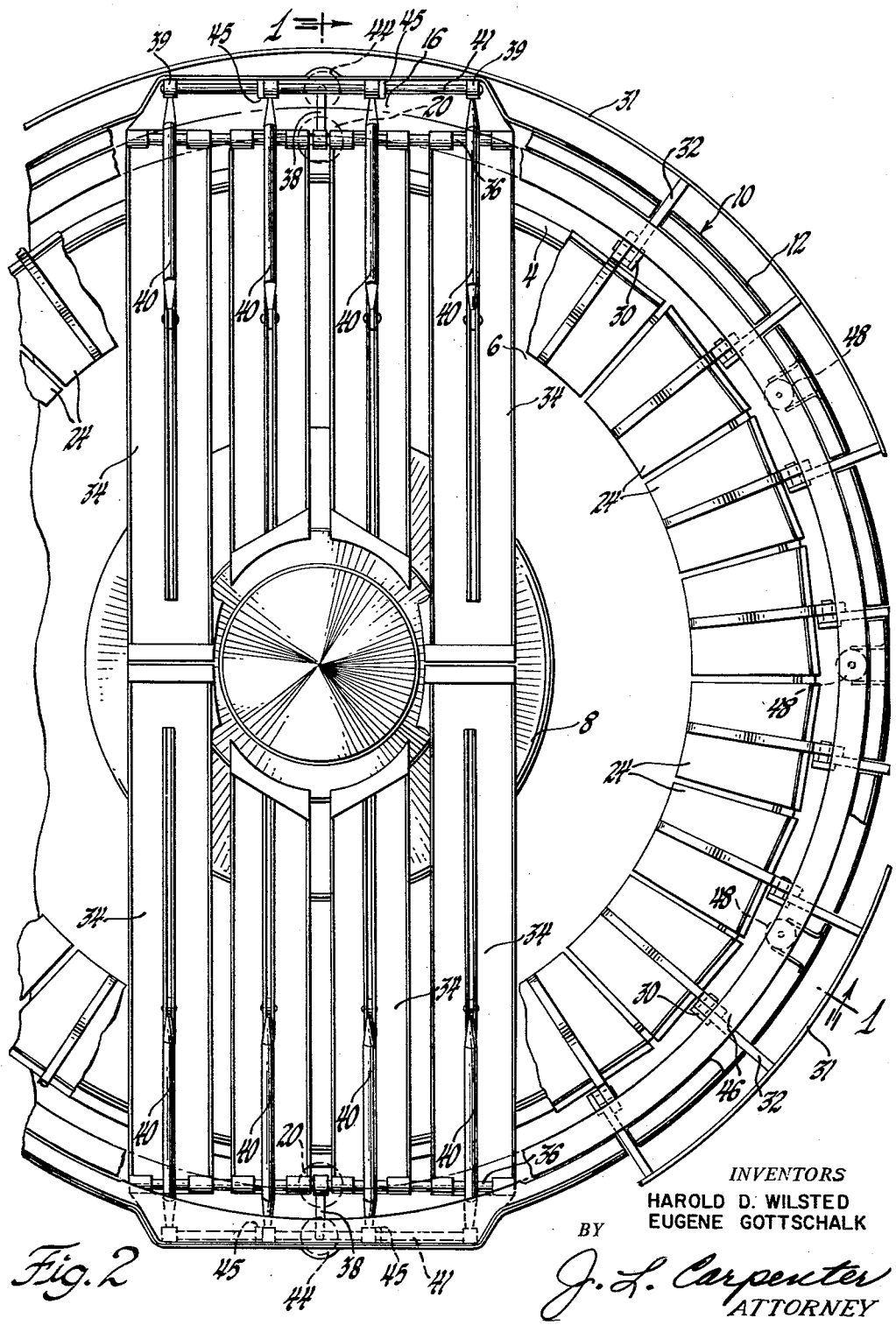
FIGURE 2 is an end view looking forward taken at the rear of the engine and shows in particular details of the thrust diverters as well as the laterally extending vanes for reversing the thrust of the engine.

Turning now to FIGURE 2 as well as FIGURE 1, it will be observed that movably mounted on the inner side of the movable outer wall or shroud 12 are a plurality of upper and lower thrust diverters 34. The upper thrust diverters are all pivotally mounted at one end on a shaft 36 by having connected thereto an operating rod 38 forming the movable portion of a servo 44. Each diverter 34 has pivotally secured thereto intermediate the ends thereof a link 40. The opposite ends 39 of the links 40 are secured to a shaft 41 adapted to ride back and forth in a pair of guideways 45 mounted on the inside of movable outer wall or shroud 12.

The lower thrust diverters are mounted and operate the same as the upper diverters.

Referring again particularly to FIGURES 1 and 2, there is mounted on the inside of the outer wall construction 31 a plurality of reversing vanes 46 which extend peripherally about the nozzle 6. The vanes are shown by solid lines in FIGURE 1 as being in a telescoped or stored condition in which they are rendered inoperative. The vanes are, however, telescopically connected together so that energization of a plurality of circumferentially spaced servos 48 mounted on the inside of the movable outer wall on shroud 12 will move these vanes apart relative to each other, and also rearward beyond the aft end of movable outer wall or shroud 12 so that they will pick up that part of the jet diverted by the diverters 34 and direct it laterally between the vanes into the atmosphere, thereby slowing down or braking the aircraft of which the engine is a part. The extended position of the reversing vanes 46 is shown in phantom at 50 in FIGURE 1.

Referring for a moment to FIGURES 4 and 5 for the telescopic construction details of the reversing vanes, it will be noted that the aft vane 46 is pinned to the aft ends of a plurality of inner rods 52 of stepped diameter which are individually encased in a plurality of sleeves 54 having engaging shoulders 56. The outermost sleeve of each set which has been designated 58 to differentiate it from the rest of the sleeves, is connected to the rod end of its associated servo 48. Thus as the servos 48 are energized to cause the rods thereof to move out of their associated cylinders, the vanes 46, shown in FIGURE 4, will be moved apart relative to each other and also beyond the aft end of movable outer wall or shroud 12 as indicated in FIGURE 5.

Referring now to FIGURE 3, the operation of the reverse construction is as follows. First, the servos 20 are energized to move the movable outer wall or shroud 12 to its rearward position as shown in the second operating position of FIGURE 3. At the same time the servos 48 may be energized causing the vanes 46 to be extended as shown in the second position of FIGURE 3. The servos 44 are now energized causing the diverters to move rearwardly until the shaft 39 moving in the guideways 45 reaches the limit of its rearward travel after which further rearward movement of rods 38 will cause the diverter to move across the path of the jet. The movable outer wall or shroud 12 may now be moved forward to the position shown in the third operating position of FIGURE 3 so that the diverters will be located relative to the tail cone 8 and vanes 46 to most efficiently divert the jet into these vanes.

It should be emphasized at this point that one of the primary advantages of making the reversing vanes movable relative to each other is the length and/or diameter of the rear end of the jet engine may be kept to a minimum.

The above operations may be accomplished in any suitable manner which will position the movable outer wall or shroud 12, diverters 34, and reversing vanes 46 as indicated in the third position of FIGURE 3, and as shown in phantom in FIGURE 1.

Returning again to FIGURE 1, it will be seen that if the vanes 46 are fixed relative to each other and properly spaced so as to catch the diverted jet and deflect it to the atmosphere, either the end of the movable outer wall or shroud 12 would have to be extended to properly house the vanes or else the diameter thereof would have to be made larger in order to avoid interference of the vanes with the end of the nozzle 6 and the primary nozzle iris segments 24. However, by making the vanes retractable they can be nicely stored, when not needed, in the space between the iris segments 24 and the aft end of movable outer wall or shroud 12.

We claim:

In a jet propulsion unit for aircraft and the like having a propulsive nozzle for forming an axially flowing jet, a device for deflecting said jet from the axis of said nozzle, comprising reverser vane elements extending laterally of the path of the axially flowing jet to thereby change the flow of said jet and brake said propulsion unit and controllable means for moving said vane elements together parallel to the axis of said nozzle to thereby enable them to be more compactly stored when not needed for braking said unit, said controllable means including telescoped sleeves to which said vane elements are secured and power driven means for telescopically extending and retracting said sleeves parallel to the axis of said nozzle.

References Cited in the file of this patent

UNITED STATES PATENTS

| | | |
|---|---|---|
| 2,654,215 | Thompson | Oct. 6, 1953 |
| 2,683,961 | Britton et al. | July 2, 1954 |
| 2,797,548 | Marchal et al. | July 2, 1957 |
| 2,930,185 | Tyler | Mar. 29, 1960 |
| 2,931,172 | Billman | Apr. 5, 1960 |
| 2,954,668 | Plummer | Oct. 4, 1960 |

FOREIGN PATENTS

| | | |
|---|---|---|
| 214,408 | Australia | Oct. 31, 1957 |
| 1,150,555 | France | Aug. 12, 1957 |
| 1,196,067 | France | May 25, 1959 |